United States Patent [19]

Beer

[11] Patent Number: 4,606,427
[45] Date of Patent: Aug. 19, 1986

[54] MOTOR VEHICLE ENGINE MOUNTING ARRANGEMENT

[75] Inventor: Wilhelm Beer, Ruselsheim, Fed. Rep. of Germany

[73] Assignee: General Motors Corporation, Detroit, Mich.

[21] Appl. No.: 784,357

[22] Filed: Oct. 3, 1985

[30] Foreign Application Priority Data

Oct. 6, 1984 [DE] Fed. Rep. of Germany ....... 3436822

[51] Int. Cl.⁴ ............................................. B60K 5/012
[52] U.S. Cl. .................................. 180/300; 248/559; 267/63 R; 267/140.5; 267/141.1
[58] Field of Search ................. 180/291, 300; 248/559, 248/638, 659; 267/57, 57.1 R, 57.1 A, 63 R, 63 A, 140.5, 141.1, 153

[56] References Cited

U.S. PATENT DOCUMENTS

| | | | |
|---|---|---|---|
| 3,730,462 | 5/1973 | Dick | 248/10 |
| 3,762,671 | 10/1973 | Schulz | 248/9 |
| 3,955,808 | 5/1976 | Jorn et al. | 267/152 |
| 4,183,496 | 1/1980 | Brock et al. | 248/638 |
| 4,381,043 | 4/1983 | Fukushima | 180/300 |
| 4,406,344 | 9/1983 | Fukushima | 180/300 |
| 4,424,961 | 1/1984 | Takei | 248/559 X |
| 4,445,662 | 5/1984 | Fukushima et al. | 248/559 |
| 4,456,213 | 6/1984 | Fukushima et al. | 248/559 |

FOREIGN PATENT DOCUMENTS 82633 7/1981 Japan ................................ 180/291

*Primary Examiner*—John J. Love
*Assistant Examiner*—Michael Mar
*Attorney, Agent, or Firm*—R. L. Phillips

[57] ABSTRACT

A mounting assembly has between an upper and a lower outer member, and between elastic members interconnected therewith, a core member made of a rigid material. The elastic members are formed and arranged in a manner to cause, upon application of an axial force onto the mounting assembly, rotational movement of the core member. On the core member, there are mounted a pair of pivotable flyweights adapted for divergent synchronous pivoting through larger or smaller angles. The arrangement enables the inertia moment of the core to be varied and the vibration attenuating characteristics of the mounting assembly to be adjusted accordingly. According to a preferable arrangement, the flyweights are adjusted by means of a servomotor.

6 Claims, 7 Drawing Figures

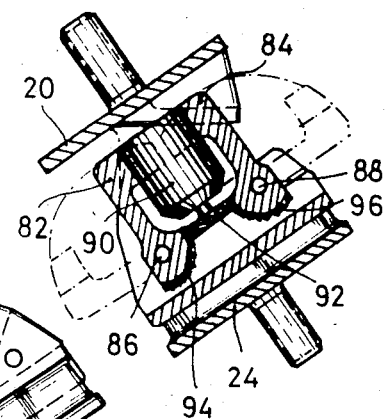
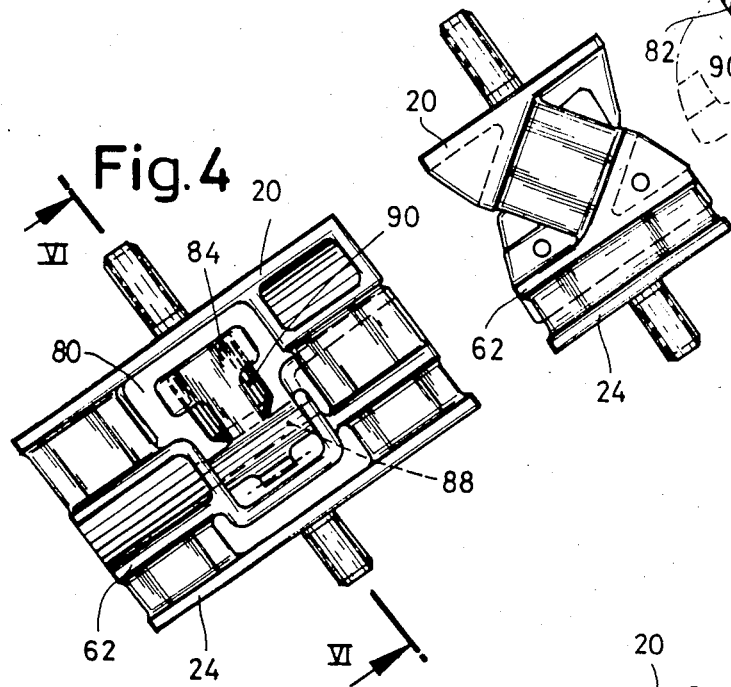
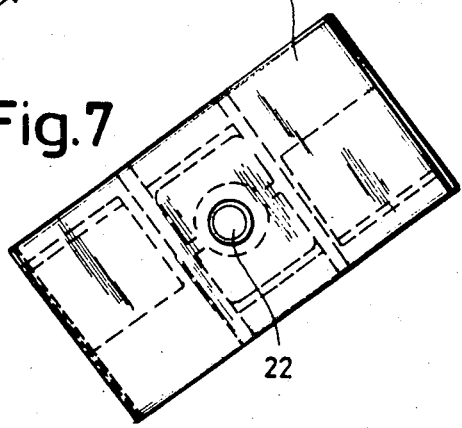

4,606,427

MOTOR VEHICLE ENGINE MOUNTING ARRANGEMENT

TECHNICAL FIELD

The invention relates to a motor vehicle mounting arrangement, and more particularly to such an arrangement wherein between two elastomeric engine mount portions, which are each secured to a respective one of a pair of rigid outer members connected, respectively, with the engine and chassis, there is mounted a rigid core member adapted for oscillating rotary movement which occurs in accordance with engine vibratory frequencies and acts substantially perpendicularly to engine vibratory movement.

BACKGROUND OF THE INVENTION

It has been proposed to form such a core with respect to the outer members, in a manner such that there will occur in one of the vibratory directions a reduction in the spacing between it and the outer members to increase the spring rate of the mounting assembly, with the core member comprising flyweights whose spacings from the core member are adjustable.

In such a mounting arrangement, the core member is caused to rotate when an axial force is acting on the engine mount, because it is urged in each section by beveled and angled surfaces to move outwardly towards the opposite side. The flyweights can be threaded, to a greater or lesser extent, out of the radial bores provided in the core member, which will enable the moment of inertia of the core, and thus the inherent frequency of the system, to be varied. This generates upon the occurrence of a force which is induced by an irregularity in the road surface and which is acting on the chassis, a counterforce which will inhibit covibration of the engine and thereby prevent reverse coupling to the body. This allows the acoustic tuning and the tuning of the vibratory comfort to be carried out separately.

However, due to the fact that the flyweights are arranged on the outside of the core member, such a mounting assembly is relatively bulky. Furthermore, the moment of inertia can be varied only within a very narrow range.

SUMMARY OF THE PRESENT INVENTION

It is an object of the present invention to provide a mounting arrangement of the type above which is relatively compact and whose inertia can be adjusted, in terms of its usefulness for application in motor vehicles, over a sufficiently wide range.

In accordance with the invention, this object is achieved in that the flyweights are made oblong and are mounted in a recess of the mounting assembly for pivoting movement perpendicularly to the axis of the mounting assembly.

This arrangement enables the centers of gravity of the flyweights to be displaced from a position proximate the axis of rotation to an outer position which, depending on the lengths of the flyweights, is relatively remote from the axis of rotation, so that the moment of inertia of the core is adjustable over a relatively wide range of values while the over-all dimensions of the mounting assembly are kept within acceptable limits. Thus, the mounting assembly according to this invention is more compact than that described above and has a wider adjustment range. Furthermore, with the provision of inertia adjustability the mounting assembly, unlike classical attenuators, is able to function at various frequencies. Its damping action is also very effective in the high frequency range (acoustic vibrations). While the mounting assembly according to the invention is lighter in weight and is less expensive, its effect is comparable to that which is achievable with two balancing shafts in a four-cylinder engine.

In one embodiment which is particularly simple and cost-effective, each flyweight is mounted proximate one of its respective ends on a shaft of the core member extending perpendicularly to the axis of the mounting assembly.

According to another feature of the invention, which results in a very compact mounting arrangement, the length dimensions of the flyweights are such that the flyweights, when in their upwardly pivoted position, are contained inside the recess.

Another arrangement which results in a structurally simple mounting assembly is one wherein the recess is formed by an open space between each pair of elastic members on either side of the core member, as viewed in axial direction.

Another preferable arrangement is one wherein the elastic members are of like configuration below the core member on both sides of the recess and are arranged parallel to the outer portion, and are also of like configuration above the core member, but are each arranged obliquely in opposite directions on both sides of the recess so as to form angles with the core and outer member, respectively. The arrangement of mounting these elastic members at opposite inclinations accomplishes, in a relatively simple manner, that whenever an axial force acts on the mounting assembly, the necessary rotating movement is imparted onto the core member.

The space midway of the mounting assembly must not necessarily be occupied by the shaft of the flyweights, especially if each of the pair of flyweights has its own shaft, and if the two shafts extend parallel to one another in the core.

If the mounting assembly is to be adjusted in dependence on variables which are applied to sensors, the required servomotor is arranged, preferably, between the flyweights.

One preferable arrangement of such an active mounting assembly is characterized in that the servomotor drives a gear wheel rotatable about an axis extending axially of the mounting assembly, with which the two flyweights are in mesh by way of a suitable toothing provided on each of the flyweights. Since in this arrangement the flyweights are in constant mesh with the toothed gear of the servomotor, their displacement always proceeds in unison, so that no asymmetry will occur with this type of adjusting procedure.

According to another advantageous feature, the vibratory and acoustic comfort can be significantly improved by incorporating a control in the servomotor which responds to the various operating modes of the motor vehicle.

According to still another advantageous feature of the invention, all unwanted frequencies occurring within the speed range of the engine can be attenuated in that the flyweights are caused to progressively move outwardly in response to increasing engine speed. In this type of flyweight control, the inertia forces are taken into account.

A further increase in vibratory and acoustic comfort is attainable in that the control system of the servomotor incorporates means which take into account not only the engine speed but also the throttle position.

According to a further feature of the invention, compatibility with various vehicle types is attained in that the control system is of the type in which interchangeable software can be used.

DESCRIPTION OF EXEMPLARY EMBODIMENT OF THE INVENTION

It should be appreciated that a variety of arrangements may be utilized in the practice of the invention. To convey the concept of the invention, two exemplary embodiments are described in the following specifications and illustrated in the drawings, wherein:

FIG. 4 is a view of a second exemplary embodiment of a mounting arrangement according to the invention.

FIG. 5 is a side view of the mounting arrangement in FIG. 4.

FIG. 6 is a longitudinal section through the mounting arrangement along line 6—6 of FIG. 4.

FIG. 7 is a plan view of the mounting arrangement in FIGS. 4, 5 and 6.

Figure 1:
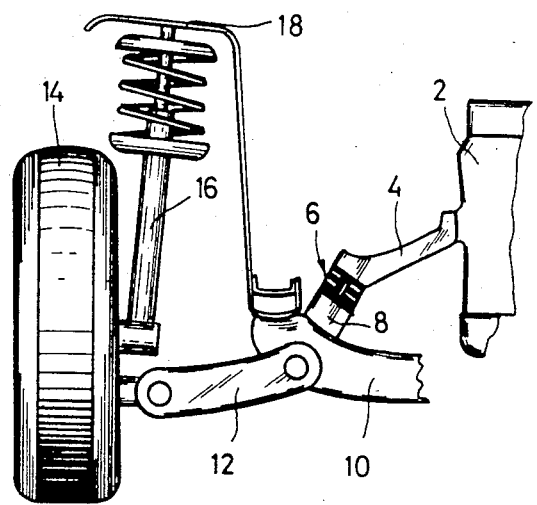
FIG. 1 is a schematic, partial front view of an engine suspension on a motor vehicle chassis including the mounting arrangement according to the invention.

In FIG. 1, an engine, which forms a drive unit with a transmission, is schematically indicated and is designated by the numeral 2. The engine 2 is supported via brackets 4 on a mounting assembly 6. The mounting assembly 6 is secured to or on a chassis component, in this case an engine mounting bracket 8 of a chassis transverse member 10. A control arm 12 of the wheel suspension is articulated to the transverse member 10. The control arm 12 is connected to the bearing neck of a front wheel 14 which is supported on the vehicle body 18 via a wheel suspension strut 16.

Figure 3:
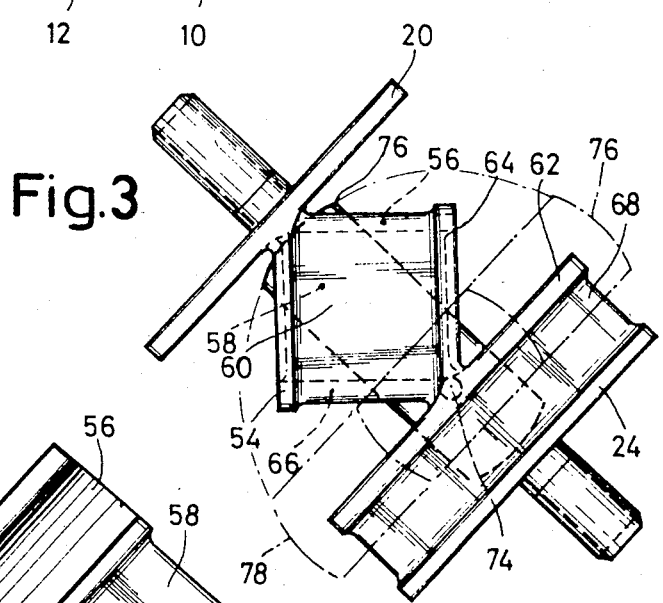
FIG. 3 is a view of the mounting arrangement in FIG. 2, as viewed from the side.
Figure 2:
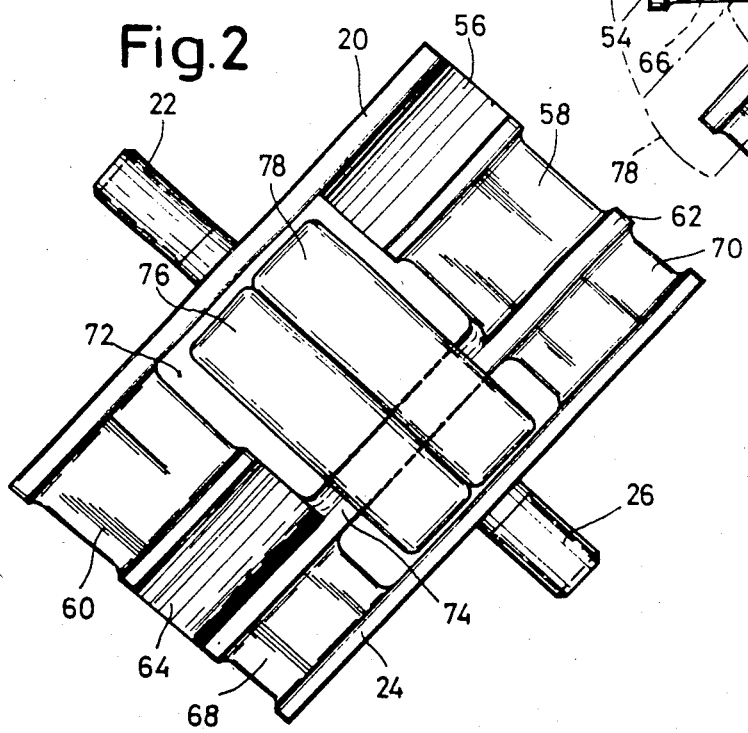
FIG. 2 is a view of the mounting arrangement in FIG. 1 at an enlarged scale.

As illustrated in FIGS. 2 and 3, the mounting assembly 6 is comprised of an upper outer portion 20 which is secured by means of a threaded stud 22 to the bracket 4, and a lower outer portion 24 which has a threaded stud 26 for attachment to the neck 8 provided on the transverse member 10. As apparent from FIG. 3, the upper outer portion 20 has two downwardly diverging support surfaces 54, 56 which are connected, respectively, with elastic members 58, 60. Since the elastic members 58, 60 have the same dimensions, member 58 is positioned in back of member 60 in FIG. 3 and is therefore not visible in this figure. Each elastic member 58, 60 bears downwardly against a core member 62 which, for this purpose, is provided with upwardly diverging support surfaces 64, 66. Thus, the elastic member 60 is arranged between the support surfaces 54, 64, whereas the elastic member 58 interconnects the support surfaces 56 and 66.

On its lower side, the core member 62 is completely flat and is connected via two elastic members 68, 70 with the lower outer portion 24. By virtue of this configuration, a recess 72 is provided between the elastic members 58, 60 and 68, 78 in which a pair of flyweights 76, 78 are accommodated for pivoting about a mounting shaft 74. In FIG. 3, the flyweights 76, 78 are illustrated in an outwardly pivoted position as well as in an upright position. In the upright position, the flyweight 78 is positioned behind the flyweight 76 and is therefore obscured from view. The means for adjusting the flyweights 76, 78 are not illustrated in the drawing. The flyweights may be adjusted in the manufacturing plant so as to be tuned to the particular vehicle type. In this instance, the vehicle is equipped with an attenuator which is calibrated for a certain frequency. Alternatively, the flyweights may be adjusted during vehicle travel by means of a servomotor in response to various running modes, as for instance, in dependence on engine rpm. In this instance, the engine mounting assembly functions as an attenuator for the entire frequency range of the unwanted engine vibrations.

The arrangement according to FIGS. 4–7 also has a recess 80 in which a pair of flyweights 82, 84 are accommodated. However, unlike the embodiment described in the foregoing, in this arrangement each flyweight 82, 84 is mounted on its own shaft 86, 88 respectively, and the two shafts 86, 88 extend parallel to one another. In the space intermediate and above the flyweight shafts 86, 88 there is mounted a servomotor 90 which is adapted to drive a gear 92. As apparent from FIG. 6, the pair of flyweights 82, 84 have teeth 94, 96 respectively in mesh with gear 92 so that the servomotor 90, depending on its sense of rotation, will pivot the flyweights synchronously outwardly or inwardly.

Except for the details mentioned above, the operation of the mounting assembly according to FIGS. 4–7 is the same as the exemplary embodiment according to the preceding figures. Any axial forces acting on the mounting assembly will cause the core member 62 with the flyweights 82, 84 to rotate. Depending on the position of the flyweights 82, 84, the core member 62 will have a given moment of inertia. When combined with the rotational force of elasticity of the elastic members 58, 60, 68, 70, this will result in a rotational inherent frequency, similar to that of a spring-mass system. If now the mounting arrangement is excited by the motor 2 at those frequencies, the core member 62 will be moved into phase shift by 180°, i.e., it will vibrate in opposition to this excitation and will attenuate the excitation. However, since the flyweights are adjustable, the moment of inertia can be varied in such a manner that for any given unwanted frequency of the motor 2 there will occur an attenuating effect of the mounting arrangement 6. Therefore, the flyweights are being varied in synchronism with the unwanted forces.

During engine idling, the flyweights 82, 84 will be positioned outwardly (highest moment of inertia of the core 62, lowest inherent frequency). During maximum engine speed, the flyweights 82, 84 will be in an upright position, as illustrated in FIG. 6. This will result in the lowest moment of inertia of the core member 62 and in the highest frequency. The ability of the core 62 to act as an attenuating means over the entire range of unwanted frequencies renders it possible to attain an effect similar to that which is realized in a four-cylinder engine equipped with two balancing shafts.

The servomotor 90 may include a control system (not illustrated) which is responsive to engine speed, accelerator position as well as other variables, such as transmission gear ratio. To render the control system suitable for use with different vehicle types, it is preferable that means be incorporated which allow the use of alterable or interchangeable software.

The above described preferred embodiments are illustrative of the invention which may be modified within the scope of the present invention.

The embodiments of the invention in which an exclusive property or privilege is claimed are defined as follows:

1. Mounting assembly for mounting an engine on a chassis of a motor vehicle comprising an upper portion connected to the engine, a lower portion connected to the chassis, a core member located between said portions, said core member and one of said portions having two sets of surfaces that face each other and are located on opposite sides of a centerline passing through said portions and core member, the surfaces of each aforesaid set being inclined relative to said centerline and oppositely those of the other aforesaid set, said core member and the other portion having two sets of surfaces that face each other and are located on opposite sides of and perpendicular to said centerline, a block of elastomeric material located between and connecting each set of oppositely facing surfaces whereby relative movement between said portions in the direction of said centerline causes rotary movement of said core member about said centerline, and oblong shaped flyweights located in recesses in said mounting assembly between said blocks of elastomeric material and connected to said core member on opposite sides of said centerline so as to adjustably swing outward about pivot axes perpendicular to said centerline from positions proximate said centerline to thereby vary the moment of inertia of said core member and thus damping thereby.

2. Mounting assembly according to claim 1, further characterized by a servomotor disposed between the flyweights for displacing same.

3. Mounting assembly according to claim 2, further characterized by the servomotor driving a gear that is rotatable about the centerline of the mounting assembly and with which the two flyweights mesh, in each case with a toothed portion.

4. Mounting assembly according to claim 3, further characterized by the servomotor having a control system responsive to actual running conditions of the motor vehicle.

5. Mounting assembly according to claim 4, further characterized by the flyweights swinging outwardly to an increasing extent with increasing engine speed.

6. Mounting assembly according to claim 4, further characterized by the control system of the servomotor being responsive to an accelerator pedal position and engine speed.

* * * * *